US 9,776,276 B2

(12) United States Patent
Kato et al.

(10) Patent No.: US 9,776,276 B2
(45) Date of Patent: Oct. 3, 2017

(54) FRICTION STIR WELDING DEVICE

(75) Inventors: Yoshinori Kato, Tokyo (JP); Satoshi Furutate, Tokyo (JP); Toshiyuki Kinoshita, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 14 days.

(21) Appl. No.: 13/812,642

(22) PCT Filed: May 27, 2011

(86) PCT No.: PCT/JP2011/062213
§ 371 (c)(1),
(2), (4) Date: Jan. 28, 2013

(87) PCT Pub. No.: WO2012/111181
PCT Pub. Date: Aug. 23, 2012

(65) Prior Publication Data
US 2013/0119115 A1    May 16, 2013

(30) Foreign Application Priority Data
Feb. 18, 2011    (JP) .................. 2011-033503

(51) Int. Cl.
*B23K 20/12*    (2006.01)
(52) U.S. Cl.
CPC ........ *B23K 20/1255* (2013.01); *B23K 20/126* (2013.01)
(58) Field of Classification Search
USPC .............................................. 228/2.1, 112.1
See application file for complete search history.

(56) References Cited

U.S. PATENT DOCUMENTS 6,199,745 B1*    3/2001    Campbell et al. ......... 228/112.1
7,896,216 B2*    3/2011    Fujimoto et al. ............. 228/2.1
(Continued)

FOREIGN PATENT DOCUMENTS

CN    101607352 A    12/2009
CN    101947691 A    1/2011
(Continued)

OTHER PUBLICATIONS

International Search Report dated Aug. 30, 2011 in International (PCT) Application No. PCT/JP2011/062213.
(Continued)

*Primary Examiner* — Devang R Patel
(74) *Attorney, Agent, or Firm* — Wenderoth, Lind & Ponack, L.L.P.

(57) ABSTRACT

A friction stir welding device (1) includes a workpiece disposition unit (2) at which workpieces (W) is disposed, a main body section (3) disposed at a surface (W4) of the workpieces (W) disposed at the workpiece disposition unit (2), a tool holding unit (4) formed in the main body section (3) to enable advance and retreat in a direction facing the workpieces (Z), which is a direction approaching and separating from the workpieces (W) disposed at the workpiece disposition unit (2), and configured to hold a tool (100), and a support medium (5) formed to satisfy a predetermined relative positional relationship in the direction facing the workpieces (Z) with respect to a first shoulder surface of the tool (100) attached to the tool holding unit (4) and configured to support the tool holding unit (4) on the surface (W4) of the workpieces (W) disposed at the workpieces disposition unit (2).

6 Claims, 6 Drawing Sheets

(56) References Cited

U.S. PATENT DOCUMENTS

| | | | |
|---|---|---|---|
| 8,052,028 B2* | 11/2011 | Hall et al. | 228/2.1 |
| 8,079,276 B2* | 12/2011 | Sylva et al. | 73/862.541 |
| 8,397,974 B2* | 3/2013 | Schultz et al. | 228/2.1 |
| 2003/0209586 A1* | 11/2003 | Thompson | 228/103 |

FOREIGN PATENT DOCUMENTS

| | | |
|---|---|---|
| JP | 59-4230 | 1/1984 |
| JP | 10-305372 | 11/1998 |
| JP | 2001-287054 | 10/2001 |
| JP | 2003-62679 | 3/2003 |
| JP | 2004-130326 | 4/2004 |
| JP | 2004-188488 | 7/2004 |
| JP | 2004-216435 | 8/2004 |
| JP | 2005-7454 | 1/2005 |
| JP | 2006-88208 | 4/2006 |
| JP | 2008-149331 | 7/2008 |
| JP | 2010-214401 | 9/2010 |

OTHER PUBLICATIONS

Written Opinion of the International Searching Authority dated Aug. 30, 2011 in International (PCT) Application No. PCT/JP2011/062213.

Chinese Office Action dated Oct. 20, 2014 in corresponding Chinese Application No. 201180037181.X with English translation.

\* cited by examiner

FIG. 9B

FRICTION STIR WELDING DEVICE

TECHNICAL FIELD

The present invention relates to a friction stir welding device configured to perform friction stir welding on workpieces.

This application claims priority to and the benefit of Japanese Patent Application No. 2011-033503 filed on Feb. 18, 2011, the disclosure of which is incorporated by reference herein.

BACKGROUND ART

One method of welding workpieces constituted by two members is a method referred to as friction stir welding. The friction stir welding is a method of generating frictional heat at workpieces surface by rotating a tool at a welding place of the workpieces in a state in which a predetermined welding pressure is applied to a surface, which is referred to as a shoulder surface of the tool, and softening and welding the workpieces by the frictional heat. The friction stir welding may include a method of using a tool, which is referred to as a bobbin tool type.

The bobbin tool-type tool has a surface side shoulder having one shoulder surface, and a rear surface side shoulder having another shoulder surface opposite to the one shoulder surface. The rear surface side shoulder is attached to a shaft section passing through the surface side shoulder. Then, when the friction stir welding is performed, the shaft section passes through the workpieces, the surface side shoulder is disposed at a surface side of the workpieces, and the rear surface side shoulder is disposed at the rear surface side. Then, while the workpieces is softened by pressing the workpieces to sandwich the surface and the rear surfaces of the workpieces between the shoulder surfaces of the surface side shoulder and the rear surface side shoulder to generate frictional heat, the shaft section inserted into the softened area is stirred, performing the friction stir welding.

Here, an error may be generated at a relative position of the workpieces surface with respect to the tool by a board pressure variation due to distortion or a manufacturing error of the workpieces, or a setting error to a surface plate. When the error is generated at the relative position of the workpieces surface with respect to the tool, a welding force applied to the workpieces from the shoulder surface of the tool is varied, and as a result, a welding error may occur. For this reason, in a hydraulic pressure biasing path configured to generate a welding force applied to the workpieces by the tool, a technique in which a feedback circuit configured to control to a certain pressure is provided has been proposed (for example, see Patent Documents 1 and 2).

CITATION LIST

Patent Documents

[Patent Document 1] Japanese Unexamined Patent Application, First Publication No. 2004-130326
[Patent Document 2] Japanese Unexamined Patent Application, First Publication No. 2010-214401

SUMMARY OF INVENTION

Problems to be Solved by Invention

However, in the friction stir welding device of Patent Documents 1 and 2, since a welding force applied by the tool is controlled by detecting (sensing) a magnitude of the hydraulic pressure to generate the welding force and feeding the magnitude back, complex control is necessary. In particular, the error is minute, and it is difficult to accurately detect the minute error and reflect the error in a control amount without delay.

In order to solve the problems, the present invention provides a friction stir welding device having a simple configuration that is capable of performing friction stir welding by accurately pressing with a tool, without being influenced by an error generated in a surface of a workpieces.

Means for Solving the Problems

In order solve the problems, the present invention proposes the following means.

A first aspect of the present invention is a friction stir welding device for performing friction stir welding on workpieces using a tool having a first shoulder surface abutting a surface of the workpieces and a second shoulder surface abutting a rear surface of the workpieces. The friction stir welding device according to the first aspect of the present invention includes workpiece disposition unit at which the workpieces are disposed; a main body section formed at the surface side of the workpieces disposed at the workpiece disposition unit; a tool holding unit formed at the main body section to enable advance and retreat in a direction facing the workpieces, which is a direction approaching and separating from the workpieces disposed at the workpiece disposition unit, and configured to hold the tool; and a support medium formed to have a predetermined relative positional relationship in the direction facing the workpieces with respect to the first shoulder surface of the tool attached to the tool holding unit and configured to support the tool holding unit on the surface of the workpieces disposed at the workpiece disposition unit.

According to the above-mentioned configuration, the tool holding unit configured to hold the tool with respect to the surface of the workpieces disposed at the workpiece disposition unit is formed to enable advance and retreat in the direction facing the workpieces by the main body section, and supported by the support medium. In addition, the first shoulder surface of the tool is formed to satisfy a predetermined relative positional relationship in the direction facing the workpieces with respect to the support medium. For this reason, the first shoulder surface of the tool held by the tool holding unit changes a position in the direction facing the workpieces along the surface of the workpieces with the tool holding unit. As a result, the relative positional relationship between the first shoulder surface and the surface of the workpieces can be constantly maintained. Accordingly, a welding force applied to the surface of the workpieces from the first shoulder surface of the tool can be accurately maintained at a desired force.

In addition, in the friction stir welding device, the support medium may include a load applying unit configured to apply a preset load toward the workpieces disposed at the workpiece disposition unit.

According to the configuration, as a preset load is applied to the workpieces disposed at the workpiece disposition unit from the support medium by the load applying unit, a reaction force corresponding to the load is always applied to the support medium from the workpieces. For this reason, even when an error is generated in the surface of the workpieces, the support medium is always adhered to the surface of the workpieces. As a result, the support medium, the tool holding unit supported by the support medium and the tool held by the tool holding unit can be scanned along the surface of the workpieces.

According to a second aspect of the present invention, the friction stir welding device has the main body section disposed above the workpieces disposed at the workpiece disposition unit. Then, the main body section supports the tool holding unit to enable advance and retreat in a vertical direction, which is the direction facing the workpieces. In addition, the load applying unit is attached to the main body section. The load applying unit has an auxiliary force applying section configured to apply an upward auxiliary force having a predetermined magnitude smaller than the weight of the tool attached to the tool holding unit and the tool holding unit with respect to the tool holding unit. Then, the load applying unit is configured to apply a load obtained by subtracting the auxiliary force from the weight of the tool attached to the tool holding unit and the tool holding unit as the load.

According to the configuration, the load obtained by subtracting the auxiliary force of the auxiliary force applying section from the weight of the tool attached to the tool holding unit and the tool holding unit is applied as the load, and the support medium receives a reaction force corresponding to the load. That is, as the load obtained by subtracting the auxiliary force from the weight of the tool holding unit and the tool is applied, an appropriate reaction force can be generated such that the support medium moves along the surface of the workpieces without applying an unnecessary burden to the workpieces.

In the friction stir welding device, the support medium may be disposed in a direction perpendicular to a scanning direction of the tool with respect to the tool held by the tool holding unit.

According to the configuration, the support medium is disposed in a direction perpendicular to the scanning direction of the tool with respect to the tool held by the tool holding unit. As a result, there is no interference with the friction stir of the workpieces due to the tool, and the tool holding unit can be supported on the surface of the workpieces by the support medium.

In the friction stir welding device, the support medium may be set such that an abutment section abutting the surface of the workpieces are disposed in the same surface along the surface of the workpieces as the first shoulder surface of the tool held by the tool holding unit.

According to the configuration, the abutment section of the support medium is disposed in the same surface along the surface of the workpieces as the first shoulder surface of the tool. As a result, in a state in which the abutment section of the support medium abuts the surface of the workpieces, the first shoulder surface of the tool can accurately coincide with the surface of the workpieces at a position in which the friction stir welding is performed.

According to a third aspect of the present invention, in the friction stir welding device, the tool has a first shoulder section including the first shoulder surface, a shaft section protruding to enable advance and retreat from the first shoulder surface, and a second shoulder section attached to a front end of the shaft section and including the second shoulder surface. In addition, the tool holding unit has a pressing unit configured to apply a force to the shaft section in the direction facing the workpieces and press the rear surface of the workpieces using the second shoulder surface.

According to the configuration, the first shoulder surface is disposed to accurately move along the surface of the workpieces, and a force is applied to the second shoulder surface by the pressing unit in the direction facing to the workpieces via the shaft section to press the rear surface of the workpieces. As a result, the workpieces can be sandwiched between the first shoulder surface and the second shoulder surface to be pressed with the welding force by the pressing unit without being influenced by the error generated at the surface of the workpieces.

Effects of Invention

According to the friction stir welding device according to the aspects of the present invention, the friction stir welding can be performed by the tool holding unit and the support medium through accurate pressing by the tool, without being influenced by an error generated at the workpieces surface, with a simple configuration.

MODES FOR CARRYING OUT INVENTION

Hereinafter, an embodiment according to the present invention will be described with reference to the accompanying drawings.

Figure 1:
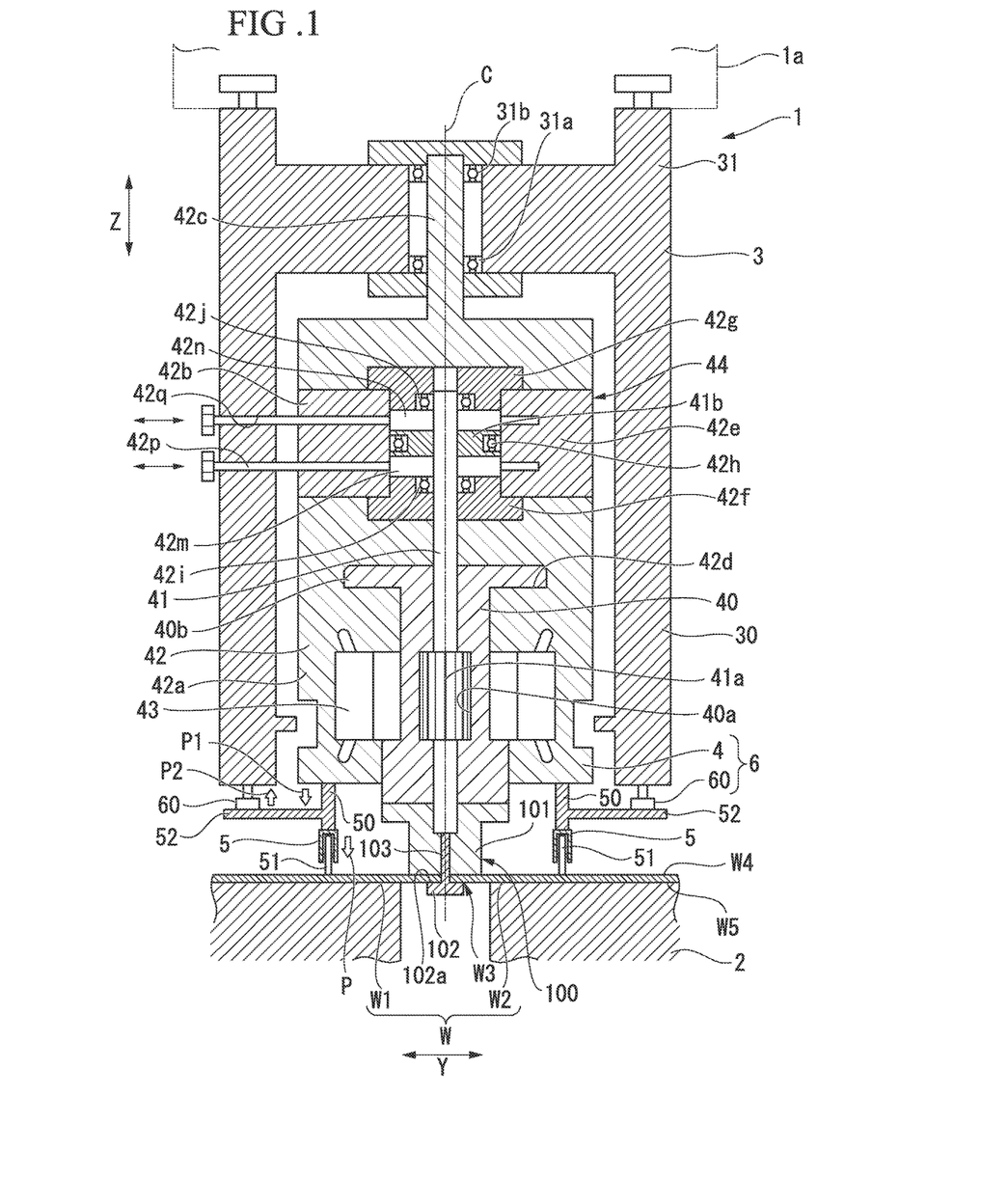
FIG. 1 is a side cross-sectional view of a friction stir welding device according to an embodiment of the present invention.

As shown in FIG. 1, a friction stir welding device 1 of the embodiment is a device for welding workpieces W constituted by a first member W1 and a second member W2 through friction stir welding at a welding place W3 of the first member W1 and the second member W2. The friction stir welding device 1 includes workpieces disposition unit 2 at which the workpieces W are disposed, a main body section 3 disposed over a surface W4 side of the workpieces W disposed at the workpiece disposition unit 2, a tool holding unit 4 installed at the main body section 3 and configured to hold a bobbin tool 100, which is a tool, a support medium 5 configured to support the tool holding unit 4 on the surface W4 of the workpieces W, and a load applying unit 6 configured to apply a preset load to the support medium 5 toward the workpieces W disposed at the workpiece disposition unit 2.

Figure 2:
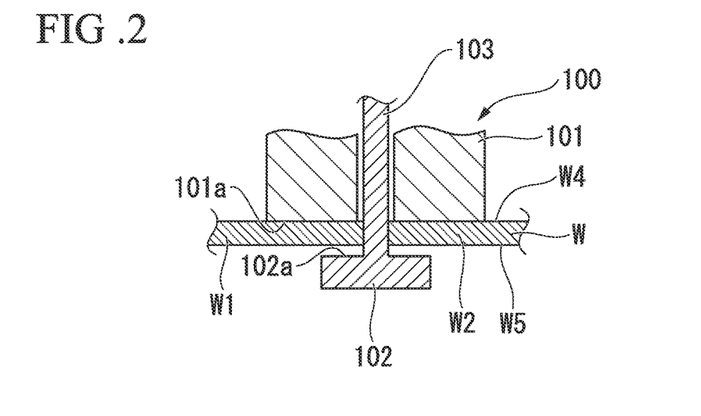
FIG. 2 is a side cross-sectional view showing a bobbin tool in detail.

Here, as shown in FIG. 2, the bobbin tool 100 has a first shoulder section 101 disposed at the surface W4 side of the workpieces W and including a first shoulder surface 101a configured to press the surface W4, a second shoulder section 102 disposed at a rear surface W5 side of the workpieces W and including a second shoulder surface 102a configured to press the rear surface W5, and a shaft section 103 protruding from the first shoulder surface 101a of the first shoulder section 101 and to which the second shoulder section 102 is connected. A through-hole opened to the first shoulder surface 101a is formed at the first shoulder section 101, and the shaft section 103 is inserted into the through-hole. For this reason, as the shaft section 103 is moved to advance and retreat along the through-hole, the second shoulder surface 102a can approach or be separated from the first shoulder surface 101a.

As shown in FIG. 1, the tool holding unit 4 has a first shoulder attachment 40 having a substantially cylindrical shape with an end surface to which the first shoulder section 101 is attached, a second shoulder attachment shaft 41 having a front end to which the shaft section 103 is attached, and a support pipe 42 having a substantially cylindrical shape and configured to support the first shoulder attachment 40 and the second shoulder attachment shaft 41. Here, the first shoulder attachment 40, the second shoulder attachment shaft 41 and the support pipe 42 are formed on the same axis such that a central shaft C is along a vertical direction Z, which becomes a direction facing the workpieces.

The first shoulder attachment 40 is formed in a substantially cylindrical shape. Then, the second shoulder attachment shaft 41 is inserted into the first shoulder attachment 40, and a base end of the second shoulder attachment shaft 41 protrudes from the first shoulder attachment 40. A key 41a is formed at the second shoulder attachment shaft 41 in an axial direction at an area which is inserted into the first shoulder attachment 40, and a flat-plate shaped piston 41b expanding in a radial direction at an area protruding from the first shoulder attachment 40. Meanwhile, a key groove 40a is formed at the first shoulder attachment 40 along the central shaft C with which the key 41a of the second shoulder attachment shaft 41 is meshed. For this reason, the second shoulder attachment shaft 41 is formed to enable advance and retreat along the central shaft C, without rotating about the central shaft C with respect to the first shoulder attachment 40. In addition, the first shoulder attachment 40 has a flange 40b expanding from a base end in the radial direction.

The support pipe 42 has an attachment accommodating section 42a configured to open downward so as to rotatably accommodate the first shoulder attachment 40 about the central shaft C, a cylinder section 42b configured to advance and retreat the second shoulder attachment shaft 41 along the central shaft C, and a supported section 42c supported by the main body section 3. The attachment accommodating section 42a has a bearing section 42d configured to accommodate the flange 40b of the first shoulder attachment 40 and rotatably support the flange 40b about the central shaft C. In addition, a motor 43 configured to rotate the first shoulder attachment 40 about the central shaft C is installed inside an inner circumferential surface of the attachment accommodating section 42a. For this reason, the first shoulder attachment 40 and the second shoulder attachment shaft 41 integrally formed by engagement of the key 41a and the key groove 40a are rotatably formed about the central shaft C by driving of the motor 43.

The cylinder section 42b has a substantially cylindrical shaped piston support section 42e configured to support the piston 41b, and a front end side support section 42f and a base end side support section 42g formed at openings of a front end side and a base end side of the piston support section 42e and configured to support the second shoulder attachment shaft 41. A bearing 42h is installed at the outer periphery surface of the piston 41b. Then, the piston 41b is supported by the bearing 42h to enable advance and retreat along the central shaft C and to be rotatable about the central shaft C with respect to the piston support section 42e. In addition, bearings 42i and 42j are also installed at the front end side support section 42f and the base end side support section 42g. Then, the second shoulder attachment shaft 41 is supported by the bearings 42i and 42j to enable advance and retreat along the central shaft C and to be rotatable about the central shaft C with respect to the piston support section 42e.

Then, a first hydraulic pressure chamber 42m and a second hydraulic pressure chamber 42n into which a working fluid is supplied are formed between the piston 41b, the front end side support section 42f and the base end side support section 42g. In addition, working fluid supply pipelines 42p and 42q passing through the main body section 3 to be connected to the outside and in communication with the first hydraulic pressure chamber 42m or the second hydraulic pressure chamber 42n are formed at the cylinder section 42b. For this reason, as the hydraulic pressure is selectively input into the first hydraulic pressure chamber 42m or the second hydraulic pressure chamber 42n via the working fluid supply pipelines 42p and 42q from the hydraulic pressure control device (not shown) installed at the outside, the second shoulder attachment shaft 41 can be slid to the front end side or the base end side along the central shaft C. As a result, a force can be applied in a direction facing the workpieces along the central shaft C with respect to the rear surface W5 of the workpieces W disposed at the workpiece disposition unit 2 to perform the pressing by the second shoulder surface 102a of the second shoulder section 102. That is, a pressing unit 44 is constituted by the hydraulic pressure control device (not shown), the cylinder section 42b and the piston 41b. In addition, the supported section 42c is formed in a shaft shape protruding from the cylinder section 42b on the central shaft C.

The main body section 3 is attached to a processing machine main shaft 1a. The main body section 3 is formed in a substantially cylindrical shape, and has an accommodating section 30 opens downward which is the surface W4 side of the workpieces W disposed at the workpiece disposition unit 2 to accommodate the tool holding unit 4, and a main body support section 31 supports the tool holding unit 4 so as to advance and retreat in the vertical direction Z which is a direction facing the workpieces such that the tool holding unit 4 approaches to or separates from the workpieces W accommodated in the accommodating section 30. The main body support section 31 has bearings 31a and 31b, and the supported section 42c is supported so as to advance and retreat along the central shaft C by the bearings 31a and 31b.

Figure 3:
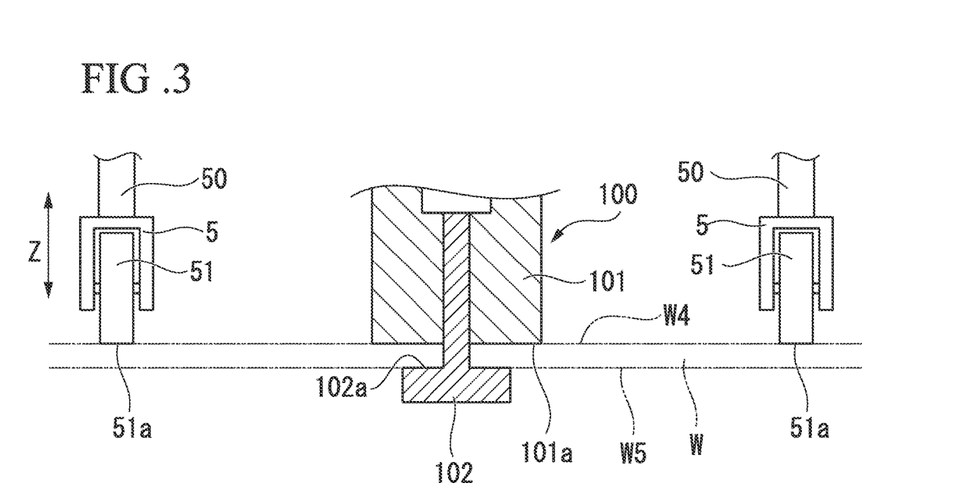
FIG. 3 is a view for specifically describing a positional relationship between a bobbin tool and a support medium in the friction stir welding device according to the embodiment of the present invention.

As shown in FIGS. 1 and 3, the support medium 5 has a support member 50 protruding from a lower end surface of the attachment accommodating section 42a of the tool holding unit 4, a roller 51 abutting the surface W4 of the workpieces W rotatably supported by the support member 50, and an expansion member 52 formed to expand from the support member 50 in the radial direction. The support medium 5 is disposed in a pair to sandwich the bobbin tool 100 at both sides in a direction Y perpendicular to a scanning direction (a depth direction of a paper surface of FIG. 1) scanning the bobbin tool 100 held by the tool holding unit 4. Then, the roller 51 is rotatably installed about a rotary shaft disposed in the direction Y perpendicular to the scanning direction. That is, the roller 51 is installed to roll on the surface W4 of the workpieces W in the scanning direction according to scanning of the bobbin tool 100 in the scanning direction.

Here, as shown in FIG. 3, an abutment section abutting the surface W4 of the workpieces W disposed at the workpiece disposition unit 2 in the support medium 5, that is, a position in the vertical direction Z of a lower end 51a of the roller 51, is set to substantially the same position as the first shoulder surface 101a of the first shoulder section 101 of the bobbin tool 100 held by the tool holding unit 4. For this reason, on the surface W4 of the workpieces W formed in a planar shape, in a state in which the lower end 51a of the roller 51 abuts the surface W4, the first shoulder surface 101a of the first shoulder section 101 also abuts the surface W4.

In addition, as shown in FIG. 1, the load applying unit 6 has the tool holding unit 4 configured to apply a force P1 which is result of a combined own weight of the load applying unit 6 to which the support medium 5 connected and which is to a downward direction and a weight of the bobbin tool 100 held thereby, and an auxiliary force applying section 60 formed between the expansion member 52 and a lower end surface of the main body section 3 and configured to apply an auxiliary force P2 in a direction along the central shaft C. The auxiliary force applying section 60 is a member configured to apply the auxiliary force P2 directed upward and having a predetermined magnitude smaller than the force P1 applied by the tool holding unit 4. For example, while the force P1 which is result of the combined weight of the tool holding unit 4 and the bobbin tool 100 is 5.0 kN to a downward direction, the auxiliary force P2 is applied at a magnitude of 4.5 kN upward, and as a result, the load applying unit 6 applies a load P of 0.5 kN to a downward direction. The auxiliary force applying section 60 is specifically an air cylinder, and in this example, even when an air pressure of about 4.5 kN is previously input and a reaction force is received according to displacement of the surface W4 of the workpieces W during processing, in particular, control of the input air pressure is not performed.

Next, effects of the embodiment will be described.

As shown in FIG. 1, when the friction stir welding is performed, the workpieces W is disposed between the first shoulder surface 101a of the first shoulder section 101 and the second shoulder surface 102a of the second shoulder section 102. In addition, the roller 51 of the support medium 5 is disposed on the surface W4 of the workpieces W. In this state, as the auxiliary force P2 having a predetermined magnitude and directed upward is applied from the auxiliary force applying section 60, the load P is applied to the support medium 5. Then, as the load P is applied to the workpieces W from the support medium 5, a reaction force corresponding to the load P is applied to the support medium 5 from the workpieces W. Then, as the motor 43 is driven to rotate the entire tool holding unit 4, an upward welding force is applied to the second shoulder section 102 by the pressing unit 44. As a result, the workpieces W receives the welding force on the rear surface W5 from the second shoulder surface 102a, a welding force corresponding to the welding force is similarly received even on the surface W4 from the first shoulder surface 101a. For this reason, frictional heat is generated between the first shoulder surface 101a and the second shoulder surface 102a and the surface W4 and the rear surface W5 of the workpieces W to perform softening, and the softened part is stirred by the shaft section 103, performing the friction stir welding.

Figure 4:
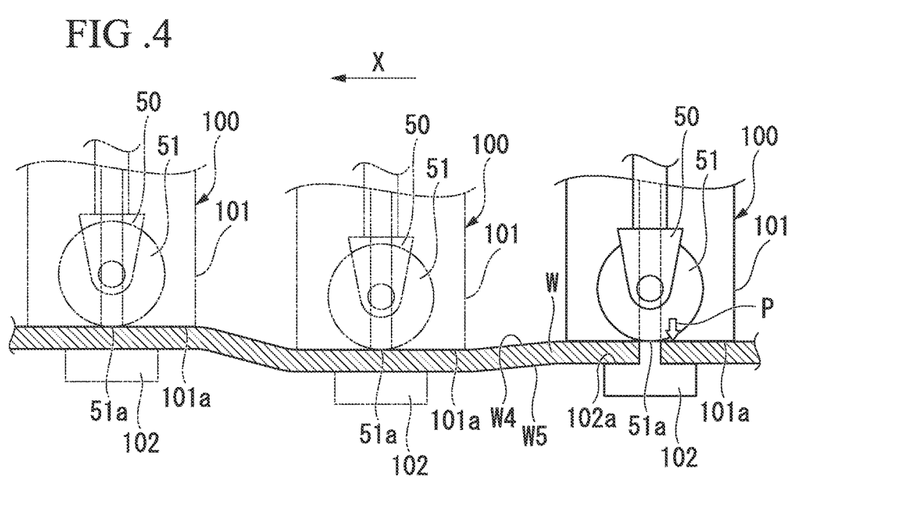
FIG. 4 is a view for describing when friction stir welding is performed by the friction stir welding device according to the embodiment of the present invention.

Here, the support medium 5 is disposed in the direction Y perpendicular to the scanning direction of the bobbin tool 100 with respect to the bobbin tool 100 held by the tool holding unit 4. For this reason, there is no interference with the friction stir of the workpieces W due to the bobbin tool 100 and the tool holding unit 4 can be supported on the surface W4 of the workpieces W by the support medium 5. Then, as described above, as the load P is applied by the load applying unit 6, the support medium 5 also receives a reaction force corresponding to the load P from the surface W4 of the workpieces W. For this reason, as shown in FIG. 4, even when the surface W4 of the workpieces W is displaced in a scanning direction X by deformation of the workpieces W itself, a variation in thickness, a disposition error of the workpieces W in the workpiece disposition unit 2, or the like, the support medium 5 follows so as to be along the surface W4 of the workpieces W.

In addition, the first shoulder surface 101a of the bobbin tool 100 is set so as to have a relative positional relationship such that a position of the first shoulder surface 101a coincides with the lower end 51a of the roller 51 of the support medium 5 in the vertical direction Z which is a direction facing the workpieces. That is, in the vertical direction Z, which is a direction facing the workpieces, a position of the first shoulder surface 101a of the bobbin tool 100 is set to coincide with the lower end 51a of the roller 51 of the support medium 5. For this reason, the first shoulder surface 101a of the bobbin tool 100 held by the tool holding unit 4 can change a position in the direction facing the workpieces along the surface W4 of the workpieces W with the tool holding unit 4, and constantly hold a relative positional relationship between the first shoulder surface 101a and the surface W4 of the workpieces W. Accordingly, the welding force applied to the surface W4 of the workpieces W from the first shoulder surface 101a of the bobbin tool 100 can be accurately maintained at a desired force.

Here, in the friction stir welding device 1 of the embodiment, as at least the tool holding unit 4 is installed to advance and retreat in the vertical direction Z, which is the direction facing the workpieces, and the tool holding unit 4 is supported on the surface W4 of the workpieces W by the support medium 5, the welding force can be accurately maintained. That is, the friction stir welding can be performed through accurate pressing by the bobbin tool 100 with a simple configuration, without being influenced by the error generated in the surface W4 of the workpieces W. Here, as the support medium 5 and the bobbin tool 100 are disposed at the same position with respect to the scanning direction, a minute error in the vertical direction of the workpieces W at a position of the bobbin tool 100 can be more accurately detected.

Figure 5:
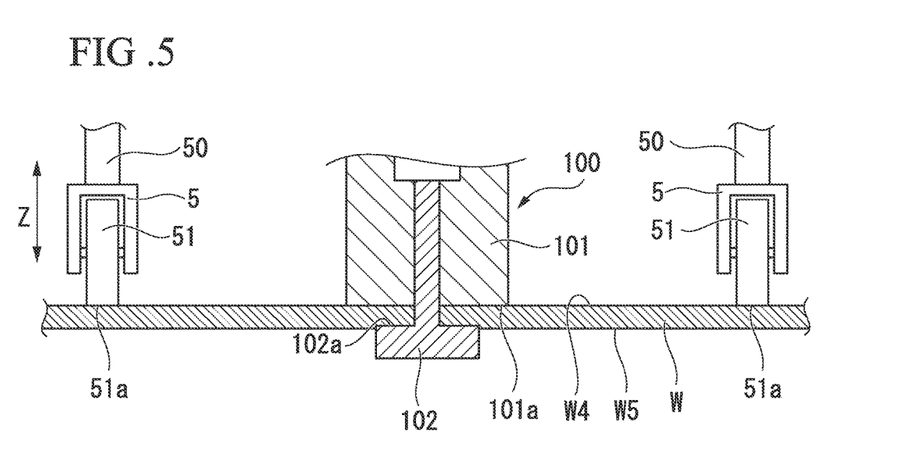
FIG. 5 is a cross-sectional view when the friction stir welding is performed by the friction stir welding device according to the embodiment of the present invention.

In addition, as described above, with respect to the lower end 51a of the roller 51, which is an abutment section abutting the surface W4 of the workpieces W in the support medium 5, the first shoulder surface 101a of the first shoulder section 101 of the bobbin tool 100 held by the tool holding unit 4 is set to a position substantially equal to the lower end 51a in the vertical direction Z. For this reason, as shown in FIG. 5, in the surface W4 of the workpieces W, an area pressed by the first shoulder surface 101a is not formed in a concavo-convex shape in comparison with other areas. For this reason, the workpieces can be finished well after the friction stir welding. In addition, as described above, in the load applying unit 6, as the load P obtained by subtracting the auxiliary force P2 from the force P1 which is result of the weight of the tool holding unit 4 and the bobbin tool 100 is applied, an appropriate reaction force can be generated such that the support medium 5 moves along the surface W4 of the workpieces W without applying an unnecessary burden to the workpieces W.

Figure 6:
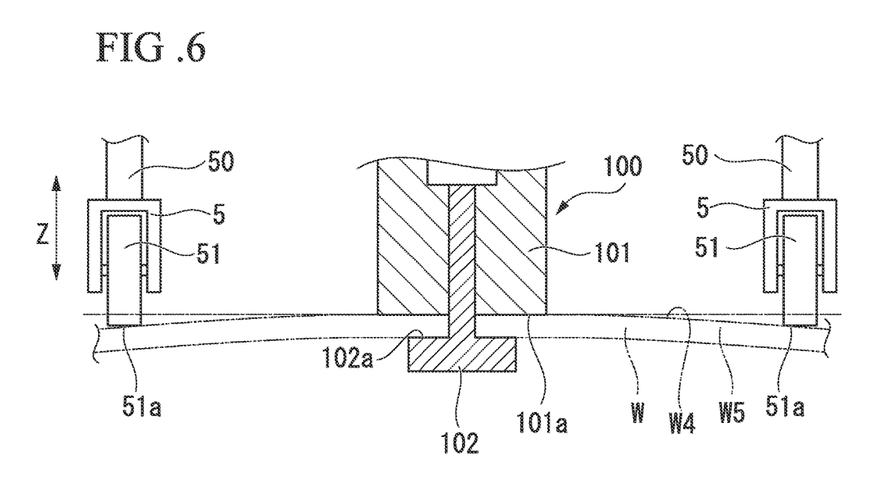
FIG. 6 is a view for specifically describing a positional relationship between a bobbin tool and a support medium in a friction stir welding device according to a first modified example of the embodiment of the present invention.

In addition, in the above, with respect to the lower end 51a of the roller 51, which becomes the abutment section abutting the surface W4 of the workpieces W in the support medium 5, while the first shoulder surface 101a of the first shoulder section 101 of the bobbin tool 100 held by the tool holding unit 4 is set to a position substantially equal to a position of the lower end 51a in the vertical direction Z, it is not limited thereto. For example, as shown in FIG. 6, when the friction stir welding is performed on the workpieces W having a curved surface, as the first shoulder surface 101a of the first shoulder section 101 of the bobbin tool 100 held by the tool holding unit 4 is disposed in the same surface on a surface along the curved surface W4, formation of the surface W4 in a concavo-convex shape can be prevented, and the workpieces can be finished well after the friction stir welding.

In addition, with respect to the lower end 51a of the roller 51, which becomes the abutment section, even when the first shoulder surface 101a of the first shoulder section 101 of the bobbin tool 100 held by the tool holding unit 4 is disposed at a position different from a position of the lower end 51a in the vertical direction Z, a relative position between the lower end 51a of the roller 51 and the first shoulder surface 101a may be set to satisfy a predetermined relationship.

Figure 7:
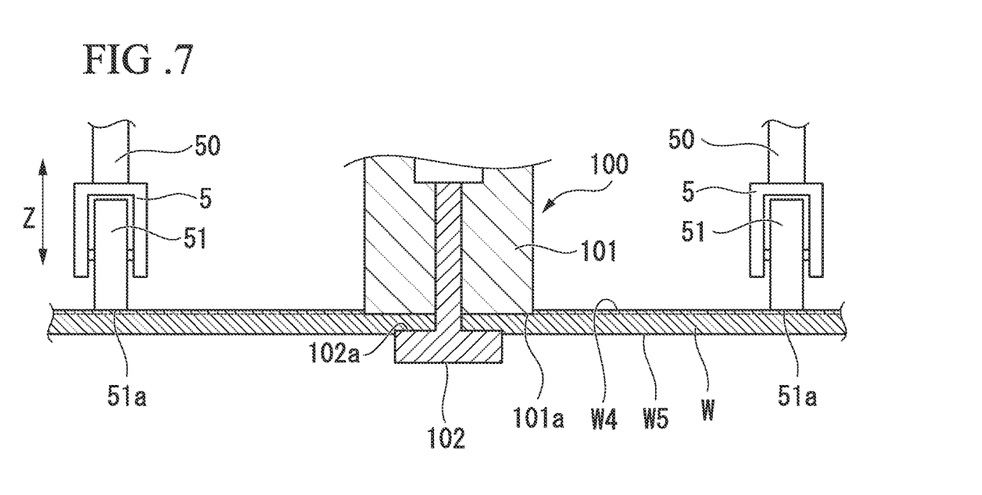
FIG. 7 is a view for specifically describing a positional relationship between a bobbin tool and a support medium in a friction stir welding device according to a second modified example of the embodiment of the present invention.
Figure 8:
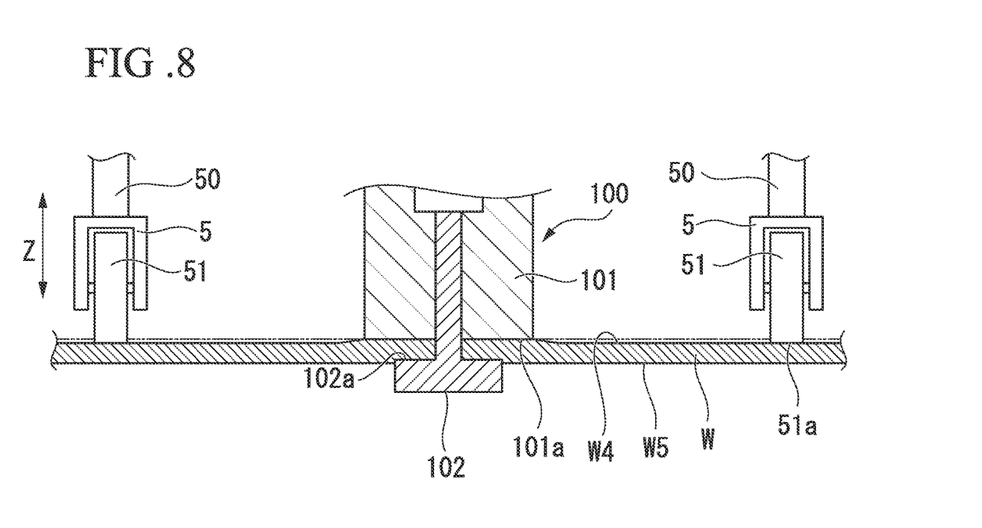
FIG. 8 is a view for specifically describing a positional relationship between a bobbin tool and a support medium in a friction stir welding device according to a third modified example of the embodiment of the present invention.

For example, as shown in FIG. 7, the first shoulder surface 101a may be disposed at a position near the workpieces W with respect to the lower end 51a of the roller 51. In this case, a concave section is formed at a welding area by a distance in which the first shoulder surface 101a approaches the workpieces W more than the lower end 51a of the roller 51. For example, when a concave section is needed to be formed to a predetermined depth in the welding area, the lower end 51a of the roller 51 and the first shoulder surface 101a may be disposed in the above-mentioned positional relationship. In addition, as shown in FIG. 8, the first shoulder surface 101a may be disposed at a position farther from the workpieces W with respect to the lower end 51a of the roller 51. In this case, a convex section is formed at the welding area by a distance in which the first shoulder surface 101a is spaced apart from the workpieces W more than the lower end 51a of the roller 51. For example, when the convex section is needed to be formed to a predetermined height in the welding area, the lower end 51a of the roller 51 and the first shoulder surface 101a may be disposed in the above-mentioned positional relationship.

In addition, in the above, while the support medium 5 is disposed in a pair to sandwich the bobbin tool 100 at both sides in a direction perpendicular to the scanning direction of scanning the bobbin tool 100 held by the tool holding unit 4, it is not limited thereto. For example, the friction stir welding device according to the embodiment of the present invention may include four support media 5 when seen in a plan view as shown in FIG. 9A, or three support media 5 when seen in a plan view as shown in FIG. 9B.

Figure 9A:
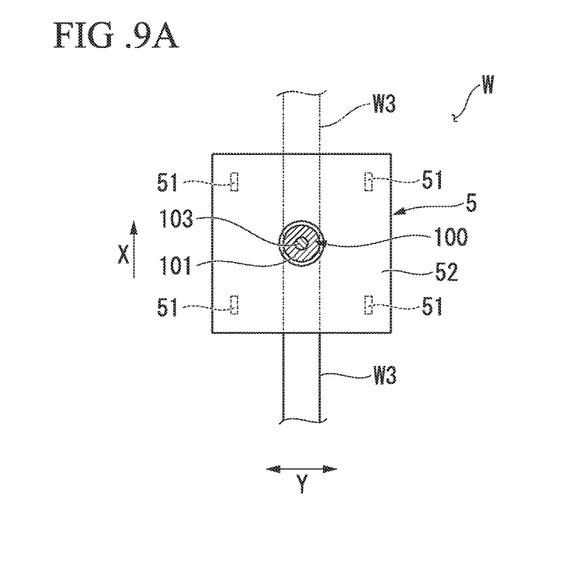
FIG. 9A is a plan cross-sectional view showing a modified example including four support media in the friction stir welding device according to the embodiment of the present invention.

As shown in FIG. 9A, when the four support media 5 are disposed, as the support media 5 are disposed so as to be along the scanning direction X in pairs at both sides in the direction Y perpendicular to the scanning direction X of the bobbin tool 100 held by the tool holding unit 4, there is no interference with the friction stir of the workpieces W due to the bobbin tool 100 and the tool holding unit 4 can be supported on the surface W4 of the workpieces W by the support 5.

In addition, in this case, even when the scanning direction X of the bobbin tool 100 is changed by 90 degrees, similarly, there is no interference with the friction stir due to the bobbin tool 100.

Figure 9B:
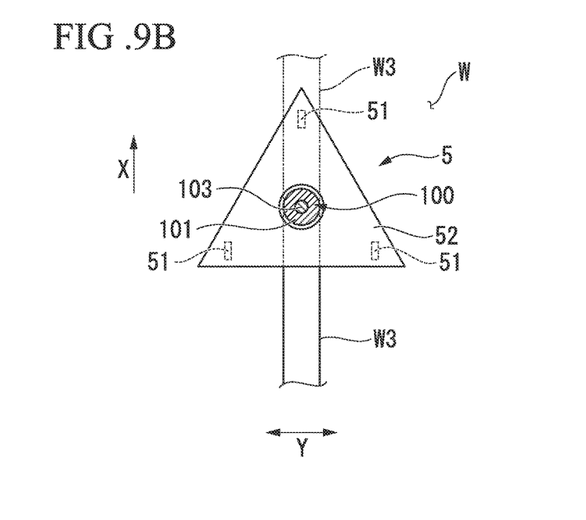
FIG. 9B is a plan cross-sectional view showing a modified example including three support media in the friction stir welding device according to the embodiment of the present invention.

In addition, as shown in FIG. 9B, when the three support media 5 are disposed, even though the two support media 5 are disposed at both sides in the direction Y perpendicular to the scanning direction X of the bobbin tool 100 held by the tool holding unit 4 and the residual one support medium 5 is disposed at a front side in the scanning direction X, since the support medium 5 at the front side in the scanning direction X scans the surface W4 of the workpieces W before joining by the friction stir, similarly, there is no interference with the friction stir due to the bobbin tool 100.

Further, in the embodiment, while the tool holding unit 4 is disposed above the workpieces W disposed at the workpiece disposition unit 2 and the tool holding unit 4 is formed to enable advance and retreat in the vertical direction Z, which is the direction facing the workpieces, it is not limited thereto. For example, the workpieces W may be disposed such that the surface W4 is formed on a vertical surface, and the tool holding unit 4 may be formed to enable advance and retreat in a horizontal direction, which becomes the direction facing the workpieces. In this case, the weight of the bobbin tool 100 held by the tool holding unit 4 and the tool holding unit 4 is not applied to the support medium 5 as a force. For this reason, in the configuration shown in FIG. 1, in order to apply the load to the support medium 5, a force generated from the auxiliary force applying section 60 itself may be used as the load generated from the load applying unit 6, and the air pressure may be input to generate the corresponding load directed toward the workpieces W, for example, a force of 0.5 kN in an example of the embodiment. In addition, in the embodiment, while the pressing unit 44 is provided and the second shoulder section 102 is formed to approach and be separated from the first shoulder section 101, it is not limited thereto. The first shoulder section 101 and the second shoulder section 102 may be fixed such that a relative position of the second shoulder section 102 with respect to the first shoulder section 101 is not varied and the pressing unit 44 may not be provided.

Hereinabove, while the embodiment of the present invention has been described with reference to the accompanying drawings, a specific configuration is not limited to the embodiment but may be design-changed without departing from the spirit of the present invention.

INDUSTRIAL APPLICABILITY

According to the friction stir welding device of the aspect of the present invention, the friction stir welding can be performed through accurate pressing by the tool without being influenced by the error generated in the workpieces surface using a simple configuration by the tool holding unit and the support medium.

DESCRIPTION OF REFERENCE NUMERALS 1 friction stir welding device
2 workpiece disposition unit
3 main body section
4 tool holding unit
5 support medium
51a lower end (abutment section)
6 load applying unit
44 pressing unit
60 auxiliary force applying section
100 bobbin tool (tool)
101 first shoulder section
101a first shoulder surface
102 second shoulder section
102a second shoulder surface
103 shaft section
W workpieces
W4 surface
W5 rear surface
X scanning direction
Y direction perpendicular to scanning direction
Z vertical direction (direction facing workpieces)

The invention claimed is:

1. A friction stir welding device for performing friction stir welding on workpieces, the friction stir welding device comprising:
a workpiece disposition unit at which the workpieces are disposed;
a main body section disposed at a surface side of the workpieces disposed at the workpiece disposition unit;
a tool having a first shoulder surface abutting surfaces of the workpieces and a second shoulder surface abutting rear surfaces of the workpieces;
a tool holding unit disposed within the main body section to enable advance and retreat in a direction facing the workpieces, which is a direction approaching and separating from the workpieces disposed at the workpiece disposition unit, the tool holding unit adapted to hold the tool such that the first shoulder surface of the tool has a relative positional relationship in a direction of advance and retreat of the tool holding unit with a support medium that is fixed to the tool holding unit such that an abutment section of the support medium abuts the surfaces of the workpieces, the support medium being configured to support the tool holding unit on the surfaces of the workpieces disposed at the workpiece disposition unit; and
a load applying unit including the tool holding unit, the load applying unit being disposed at the support medium and configured to apply a preset load toward the workpieces disposed at the workpiece disposition unit, wherein the main body section is disposed above the workpieces disposed at the workpiece disposition unit, and supports the tool holding unit to enable advance and retreat in the direction of advance and retreat, which is a vertical direction, and which is the direction facing the workpieces,
the load applying unit also includes an auxiliary force applying section attached to the main body section and configured to apply an upward auxiliary force having a predetermined magnitude smaller than a weight of the tool and the tool holding unit, and configured to apply a load obtained by subtracting the upward auxiliary force from the weight of the tool attached to the tool holding unit and the tool holding unit as the preset load,
the auxiliary force applying section is an air cylinder that produces the auxiliary force by air pressure, and
the air pressure is not controlled while the friction stir welding is being performed so that the relative positional relationship in the direction of advance and retreat of the tool holding unit between the abutment section and the first shoulder surface does not change while the friction stir welding is being performed.

2. The friction stir welding device according to claim 1, wherein
the tool holding unit is configured to hold the tool such that the first shoulder surface of the tool is set to coincide with a lower end surface of the abutment section in the direction of advance and retreat.

3. The friction stir welding device according to claim 1, wherein the support medium is disposed in a direction perpendicular to a scanning direction of the tool with respect to the tool held by the tool holding unit.

4. The friction stir welding device according to claim 1, wherein the support medium is arranged at a position so that the abutment section of the support medium, which abuts the surfaces of the workpieces, and the first shoulder surface of the tool held by the tool holding unit are aligned on a same surface along the surfaces of the workpieces.

5. The friction stir welding device according to claim 1, wherein
the tool has a first shoulder section including the first shoulder surface, a shaft section protruding to enable advance and retreat from the first shoulder surface, and a second shoulder section attached to a front end of the shaft section and including the second shoulder surface, and
the tool holding unit has a pressing unit configured to apply a force to the shaft section in the direction facing the workpieces and press the rear surfaces of the workpieces using the second shoulder surface.

6. The friction stir welding device according to claim 1, wherein
the tool holding unit is configured to hold the tool such that a position of the first shoulder surface of the tool is set to be different from a position of a lower end surface of the abutment section in the direction of advance and retreat.

* * * * *